United States Patent
He et al.

(10) Patent No.: US 7,116,848 B2
(45) Date of Patent: Oct. 3, 2006

(54) OPTICAL SPECTRUM ANALYZER USING A DIFFRACTION GRATING AND MULTI-PASS OPTICS

(75) Inventors: Gang He, Sainte-Foy (CA); Daniel Gariépy, Charlesbourg (CA); Gregory Walter Schinn, Sillery (CA)

(73) Assignee: EXFO Electro-Optical Engineering Inc., Vanier (CA)

( * ) Notice: Subject to any disclaimer, the term of this patent is extended or adjusted under 35 U.S.C. 154(b) by 197 days.

(21) Appl. No.: 10/986,833

(22) Filed: Nov. 15, 2004

(65) Prior Publication Data

US 2005/0094934 A1 May 5, 2005

Related U.S. Application Data

(63) Continuation-in-part of application No. 09/827,141, filed on Apr. 6, 2001, now Pat. No. 6,819,429.

(60) Provisional application No. 60/195,204, filed on Apr. 7, 2000.

(51) Int. Cl.
  *G02B 6/00* (2006.01)
  *G02B 6/34* (2006.01)
  *G02B 5/30* (2006.01)
  *G02B 27/28* (2006.01)
  *G01J 3/28* (2006.01)

(52) U.S. Cl. .................. 385/11; 356/328; 359/483; 385/36

(58) Field of Classification Search .................. 385/11, 385/15, 16, 24, 31, 36, 37; 359/483–488, 359/493–497; 356/326–328, 334
See application file for complete search history.

(56) References Cited

U.S. PATENT DOCUMENTS

| | | | |
|---|---|---|---|
| 3,729,261 A | 4/1973 | Sandercock |
| 3,924,201 A | 12/1975 | Crow |
| 4,014,614 A | 3/1977 | Sandercock |
| 4,225,236 A | 9/1980 | Sandercock |
| 4,551,019 A | 11/1985 | Vella et al. |
| 4,556,314 A | 12/1985 | Stone |

(Continued)

OTHER PUBLICATIONS

Sandercock, J.R., "The Design and Use of a Stabilised Multi-passed Interferometer of High Contrast Ratio" in the published Proceedings of the Second International Conference of Light Scattering in Solids Flammarlon Paris, pp. 9 to 12, 1971.

(Continued)

*Primary Examiner*—Brian Healy
*Assistant Examiner*—Charlie Peng
(74) *Attorney, Agent, or Firm*—Thomas Adams

(57) ABSTRACT

A polarization independent optical spectrum analyzer comprises a diffraction grating, input and output slit means and polarization-maintaining multi-pass optics for directing a light beam to and fro across the diffraction grating while maintaining its linear state of polarization. The optical spectrum analyzer further comprises a polarization control unit for decomposing a light beam for analysis into first and second beams having mutually orthogonal states of polarization (SOPs) and then adjusting one or both SOPs so that they are parallel to each other and to one of the dispersion plane of the diffraction grating which is rotated to select different wavelengths of the first and second light beams. The first and second light beams are passed across the diffraction grating repeatedly by multi-pass polarization-maintaining optics and are outputted and detected separately.

22 Claims, 6 Drawing Sheets

U.S. PATENT DOCUMENTS

| | | | |
|---|---|---|---|
| 4,710,022 | A | 12/1987 | Soeda et al. |
| 4,752,130 | A * | 6/1988 | George et al. ............... 356/334 |
| 4,984,884 | A | 1/1991 | Ryu et al. |
| 5,199,042 | A | 3/1993 | Papetti et al. |
| 5,390,017 | A | 2/1995 | Ozeki et al. |
| 5,406,368 | A | 4/1995 | Horiuchi et al. |
| 5,751,482 | A | 5/1998 | Challener, IV |
| 5,969,806 | A | 10/1999 | Bergano |
| 6,075,647 | A | 6/2000 | Braun et al. |
| 6,177,992 | B1 * | 1/2001 | Braun et al. ................. 356/327 |
| 6,744,506 | B1 * | 6/2004 | Kaneko et al. .............. 356/328 |
| 2005/0073679 | A1 * | 4/2005 | He et al. .................... 356/328 |
| 2006/0038997 | A1 * | 2/2006 | Julian et al. ................ 356/328 |

OTHER PUBLICATIONS

Vobis, Joachim and Derickson, Dennis, "Optical Spectrum Analysis", Chapter 3, pp. 87-115.

Ogusu M., et al., "A Thermally Stable Fabry-Perot Tunable filter for 1 A-Spaced High-Density WOM Systems", IEEE Photonics Technology Letter, vol. 5, No. 10, pp. 1222-1224, Oct. 1993.

Durvasula, L.N., et al., "Pressure-scanned three-pass Fabry-Perot Interferometer", Applied Optics, vol. 17, No. 20, pp. 3298-3303, Oct. 15, 1978.

Roychoudhuri, Chandrasekhar and Hercher, Michael, "Stable multipass Fabry-Perot Interferometer: design and analysis", Applied Optics, vol. 16, No. 9, pp. 2514-2520, Sep. 1977.

Harley, R.T., "Optical alignment of a multipass Fabry-Perot Brillouin scattering spectrometer", J. Phys. E: Sci. Instrum., vol. 12, pp. 255-256, 1979.

Daehler, Mark, and Roesler, F.L., "High Contrast in a Polyetaion Fabry-Perot Spectrometer", Applied Optics, vol. 7, No. 6, pp. 1240-1241, Jun. 1968.

Frenkel, Anatoly and Lin, Chinlon, "Toned Etalon Filters for Optical Channel Selection in High Density Wavelength Division Multiplexed Systems", Journal of Lightwave Technology, vol. 7, No. 4, pp. 614-624, Apr. 1989.

Sandercock, J.R., "Some Recent Developments in Brillouln Scattering", RCA Review, vol. 36, pp. 89-107, Mar. 1975.

Möller, Lothar and Kogelnik, Herwig, PMD Emulator Restricted to First and Second Order PMD Generation, ECOC '99, Sep. 1999.

Frenkel, Anatoly and Lin, Chinlon, "Multiple Angle-Tuned Etalon Filters for Optical Channel Selection in Wavelength-Division Multiplexed and Optical Frequency-Division Multiplexed Direct Detection Transmission Systems", Opt. Lett. vol. 13, No. 8, pp. 684-686, Aug. 1988.

* cited by examiner

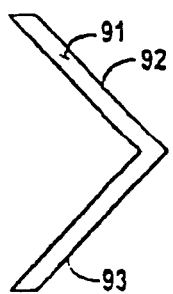 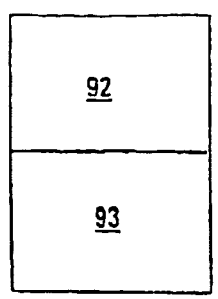 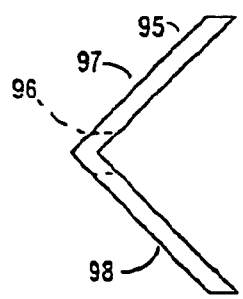 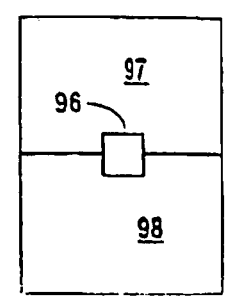
FIG. 9A  FIG. 9B  FIG. 9C  FIG. 9D
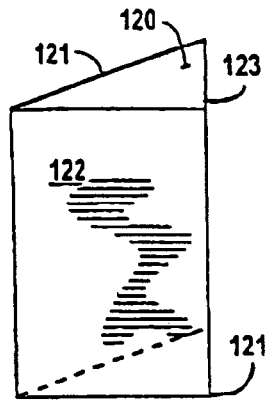 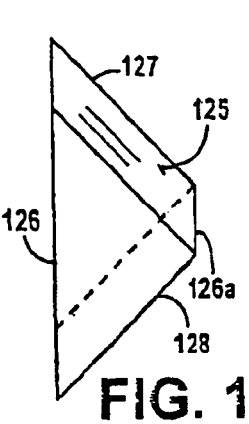 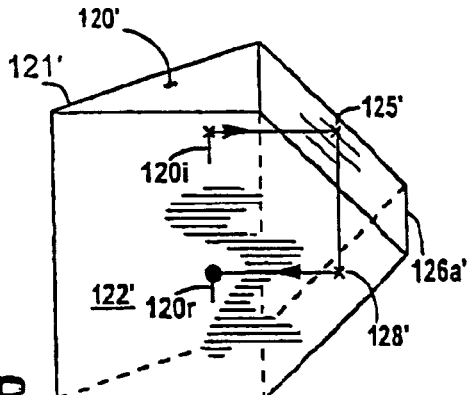
FIG. 10A  FIG. 10B  FIG. 10C
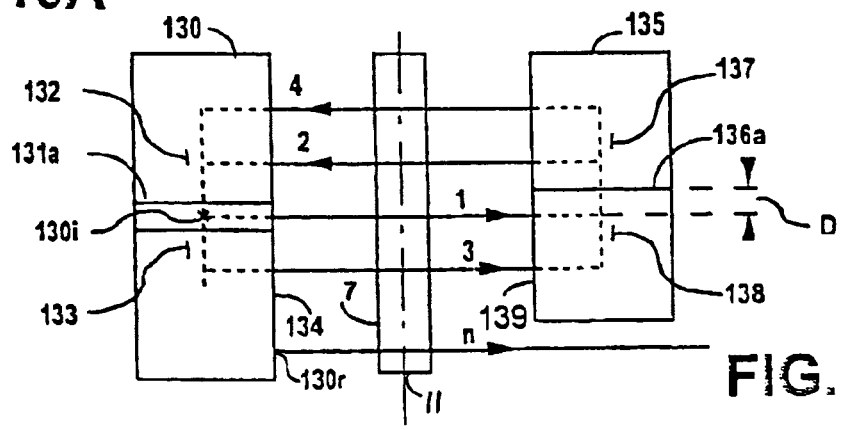
FIG. 11A
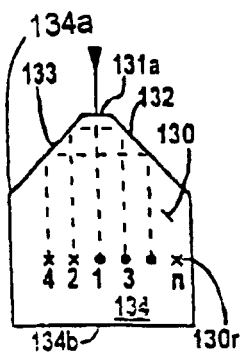 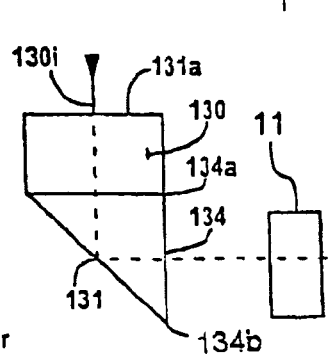 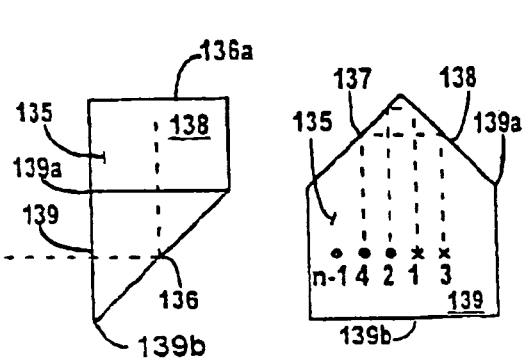
FIG. 11B  FIG. 11C  FIG. 11D

OPTICAL SPECTRUM ANALYZER USING A DIFFRACTION GRATING AND MULTI-PASS OPTICS

This application is a continuation-in-part of U.S. patent application Ser. No. 09/827,141 filed Apr. 6, 2001 now U.S. Pat. No. 6,819,429 and claims priority from U.S. Provisional patent application No. 60/195,204 filed Apr. 7, 2000. The contents of these prior applications are incorporated herein by reference.

TECHNICAL FIELD

The invention relates to optical spectrum analyzers comprising a diffraction grating and optics for directing light beams onto the diffraction grating more than once.

BACKGROUND ART

With the development of High Density Wavelength Division Multiplexing (HDWDM) applications, for example as used in communications conducted via optical fiber transmission mediums, the need for quality optical spectrum receivers and analyzers has become acute. In particular, there is a demand for optical spectrum analyzer (OSA) instruments that are robust, compact and yet display a sufficient optical rejection ratio (ORR) close in to a spectral feature (e.g, laser carrier signal) to be measured. This is particularly so for portable instruments that are to be used in the field.

As described in the text book "Optical Spectrum Analysis", authored by Joachim Vobis and Dennis Derickson, the three main optical spectrum resolving technologies that have been used in optical spectrum analyzers (OSAs) are Michelson interferometers, tunable Fabry-Perot optical filters and diffraction gratings.

OSAs employing Michelson interferometers (coupled with Fourier transform analysis) provide high wavelength precision and good spectral resolution, but the robustness and effective ORR limitations of such instruments continue to present problems. For example, the maximum effective ORR presently achievable is in the order of 35 dB (even far from the spectral feature), which is far less than what is desired.

OSAs using tunable Fabry-Perot filters are usually compact and rugged in nature. The various designs require trade-offs, however, between resolution, free spectral range and ORR. ORR can be improved by using multi-cavity filters, or cascading filters or by the multiple passes through the filter. However, when manufacturing multi-cavity filters using coating techniques, it is quite difficult to match the cavities. Three-cavity filters are presently available with a spectral resolution (FWHM) of 0.5 to 1.0 nm. The paper entitled "Multiple Angle-Tuned Etalon Filters for Optical Channel Selection in Wavelength Division Multiplexed and Optical Frequency Division Multiplexed Direct Detection Transmission Systems" by Anatoly Frenkel and Chinlon Lin—Opt. Lett. Vol. 13, pp 684–686, 1988 describes instruments with cascaded identical filters and cascaded nonidentical filters. Although individual angle-tuned filter elements exhibit properties apparently suitable for optical wavelength discrimination, generally, to cascade two or more filters is complicated because of inter-cavity interference problems. Also, when non-identical filters are cascaded, tuning synchronization may present problems.

Multi-pass filters are disclosed in the paper entitled "The Design and Use of a Stabilised Multi-passed Interferometer of High Contrast Ratio" by J. R. Sandercock in the published Proceedings of the Second International Conference of Light Scattering in Solids, Flammarion, Paris, pp. 9 to 12, 1971, and U.S. Pat. No. 3,729,261 which issued on Apr. 24, 1973 naming John R. Sandercock as an inventor. Sandercock describes a 5-pass filter configuration which uses a pair of corner cube retroreflectors. As corner cube retroreflectors cannot maintain the polarization states between the input and output beams, the filter used must be polarization-insensitive in both insertion loss and wavelength splitting. Since angle-tuned filter elements are polarization-sensitive, they cannot be used.

A wide spectrum of optical energy, from infrared through the visible spectrum, is commonly used as a means of conveying information via various optical fiber transmission media. In the telecommunications industry optical semiconductor lasers are typically used as light sources. Although the beam emitted by an optical laser tends to be of a fixed linear polarization, the emitted beam is typically received after having traversed various optical fiber conduits, so the received beam's state of polarization is not accurately predictable. The received beam's state of polarization may vary in an unpredictable manner over a period of time. Because angle-tuned filters are inherently polarization-sensitive, they are not practical for use in detecting the spectral characteristics of such a beam of unknown or unpredictable polarization. In addition, angle-tuned filter elements available commercially at present have a wavelength range of no more than about 100 nm, so the operational bandwidth of an optical spectrum analyzer using an angle-tuned filter element would be limited.

A diffraction grating, in combination with input and output slits, may be used as a tunable optical filter, and the optical spectral resolution improved by reducing the size of the input and output slits. An OSA using such a device could be expected to have a larger (e.g. of 500 nm or more) than an OSA using a tunable Fabry-Perot filter. However, the state of polarization (SOP) of incident light must be linear and parallel to a dispersion plane of the grating in order to be reflected or transmitted efficiently. Diffraction gratings are inherently polarization-sensitive, except perhaps for one particular wavelength.

Diffraction grating technology is the most widely used for OSAs in fiber testing equipment As was the case for the Michelson interferometer technology, many efforts have been made to improve the ORR close in to a spectral feature (e.g., ±0.4 nm), as well as the robustness of such devices. For example, approaches to improve the ORR include the use of double monochromators or the use of a double pass/double filtering process to make the lines sharper. The disadvantage of this approach is that it requires an intermediate spatial filter (i.e. a slit) and it tends to be bulkier, less robust and more expensive.

U.S. Pat. No. 5,886,785 (Lefevre et al.) discloses an OSA in which an input light beam is separated into two linearly-polarized secondary light beams, one of which is then rotated by a halfwave ($\lambda/2$) plate so that their states of polarization are parallel. The parallel beams are reflected by a pair of right-angled dihedral reflectors so that they are diffracted four times by the same diffraction grating before being recombined at the output of the OSA. Because the two light beams follow the same path (in opposite directions) between the reflectors and the grating, any polarization-dependent losses affect them both equally.

There are several disadvantages to the OSA disclosed by Lefevre et al. Firstly, the fact that the two light beams are recombined at the output is not conducive to the use of such an OSA for some applications where it is desirable to know the power of each of the two orthogonal components of the input light beam. Secondly, the waveplate used in their invention introduces a half-wave retardance at only one wavelength. Consequently, for other wavelengths, the resulting SOP exiting the waveplate will deviate from the desired linear SOP and lead to additional loss in the OSA. If used over a relatively limited wavelength range (e.g. 1480 nm–1620 nm), this loss is not major and can be compensated in the firmware, but if used over a much wider range typical of Coarse Wavelength Division Multiplexing (CWDM) (e.g. 1280 nm–1620 nm), this additional loss can significantly degrade the sensitivity of the OSA. Thirdly, the preferred embodiment of Lefevre et al.'s OSA uses the endface of the same fiber as a common input and output slit, and hence the design requires a circulator, 50/50 coupler or other separation means to separate the returning light for subsequent detection. Any polarisation dependent loss (PDL) in the separation means will limit the accuracy of intensity measurements made by the OSA Finally, the use of the same fiber for both the input and output renders the OSA very susceptible to any residual backreflection from the various component parts. For instance, a small reflection from the initial collimating lens after the fiber endface will reflect back into the detection means. If the signal under test comprises, say, 40 DWDM channels, this could introduce a significant amount of background noise to the desired measurement.

DISCLOSURE OF INVENTION

In this specification, the term "light" will be used for electromagnetic energy such as that suitable for use for optical communications, including infrared and visible light. Also, the term "polarization-dependent" will be used to refer to the polarization-dependence of the detected light intensity as a function of input SOP to the OSA.

The present invention seeks to eliminate, or at least mitigate, one or more of the disadvantages of the prior art, or at least provide an alternative.

In accordance with the present invention, there is provided an optical spectrum analyzer apparatus comprising:

a diffraction grating element for angularly dispersing light incident thereupon according to its constituent wavelengths;

a polarization control module for receiving input light for analysis, decomposing the received input light into its ordinary and extraordinary components to produce corresponding first and second light beams having respective mutually orthogonal linear states of polarization and, using at least one twisted polarization-maintaining fiber, rotating the state of polarization of at least one of the first and second light beams relative to the state of polarization of the other of the first and second light beams until the two states of polarization are parallel;

input slit means for receiving said first and second light beams from the polarization control module and directing said first and second light beams to said diffraction grating element such that their states of polarization are parallel to each other and perpendicular to the dispersion plane of the diffraction grating element;

a pair of non-planar optical reflection means for defining paths whereby each of said first and second light beams is directed to traverse the diffraction grating element a predetermined plurality of times each traversal occurring in a different dispersion plane from the previous traversal;

output slit means for selectively receiving at least a portion of each of the first and second light beams following diffraction said predetermined plurality of times;

detection means for detecting the first and second light beams leaving the output slit means and detecting energy at each of said different wavelengths without first recombining the light beams optically; and control means for adjusting one or both of the diffraction grating element and the non-planar optical means so as to select different wavelengths of the dispersed first and second light beams for output by the output slits and processing the detected energy values.

The diffraction grating element may be transmissive or reflective.

The control means may comprise a rotator unit for rotating the diffraction grating under the control of a microcomputer, which may also process detected energies.

The input and output slit means are spatial filters and may comprise ends of optical fibers, preferably arranged in a fiber array. In the case of optical fibers or fiber arrays, the effective slit shape is circular.

The pair of non-planar optical reflection means may comprise a pair of right-angle reflectors each having a pair of reflective surfaces arranged at right angles to each other and disposed so that a light beam incident upon one of the reflectors substantially obliquely to one of the reflective surfaces thereof is reflected by both reflective surfaces thereof to emerge substantially parallel to the direction of incidence, being incident upon the other reflector obliquely to one of its surfaces and being reflected by both surfaces to emerge substantially parallel to the direction of incidence, the arrangement being such that the light beam is reflected by each reflector surface a predetermined number of times and an equal number of times in each direction of rotation, the arrangement being such that inaccuracies in the angle between each pair of the reflective surfaces are compensated.

The pair of non-planar optical reflection means may be a pair of right-angle reflectors juxtaposed so that the two light beams each can be made to reflect back and forth between them a predetermined number of times.

The pair of right-angle reflectors may each have an apex and a base, with the bases disposed so that each of the two light beams can be made to reflect back and forth between the right angle reflectors a predetermined number of times. A region adjacent the apex of one of the right angle reflectors may be a planar surface parallel with the base, for either receiving the two light beams and emitting the reflected light beam, or vice versa.

In various embodiments of the different aspects of the invention, the pair of right angle reflectors may comprise any of Porro prisms, pi prisms or hollow roof mirrors.

BRIEF DESCRIPTION OF THE DRAWINGS

Embodiments of the invention will now be described by way of example only and with reference to the accompanying drawings, in which:

FIGS. 9A and 9B illustrate an example of a hollow roof mirror which may be used as a non-planar reflectors in the multi-pass optics of FIGS. 3, 4, 8A and 8B;

FIGS. 9C and 9D illustrate an example of another hollow roof mirror which may be used in the multi-pass optics of FIGS. 3, 4, 7A and 7B;

FIGS. 10A and 10B are perspective views of porro prisms which may be used as the non-planar reflectors illustrated in FIGS. 5, 6, 7A and 7B;

FIG. 10C is a perspective view of a pi prism which may be used as a non-planar reflector;

FIG. 11A is a side elevational view of multi-pass optics comprising a pair of pi prisms each being generally similar to that shown in FIG. 10C; and FIGS. 11B, 11C and 11D are further views of the pi prisms illustrated in FIG. 11A.

BEST MODES FOR CARRYING OUT THE INVENTION

Figure 1:
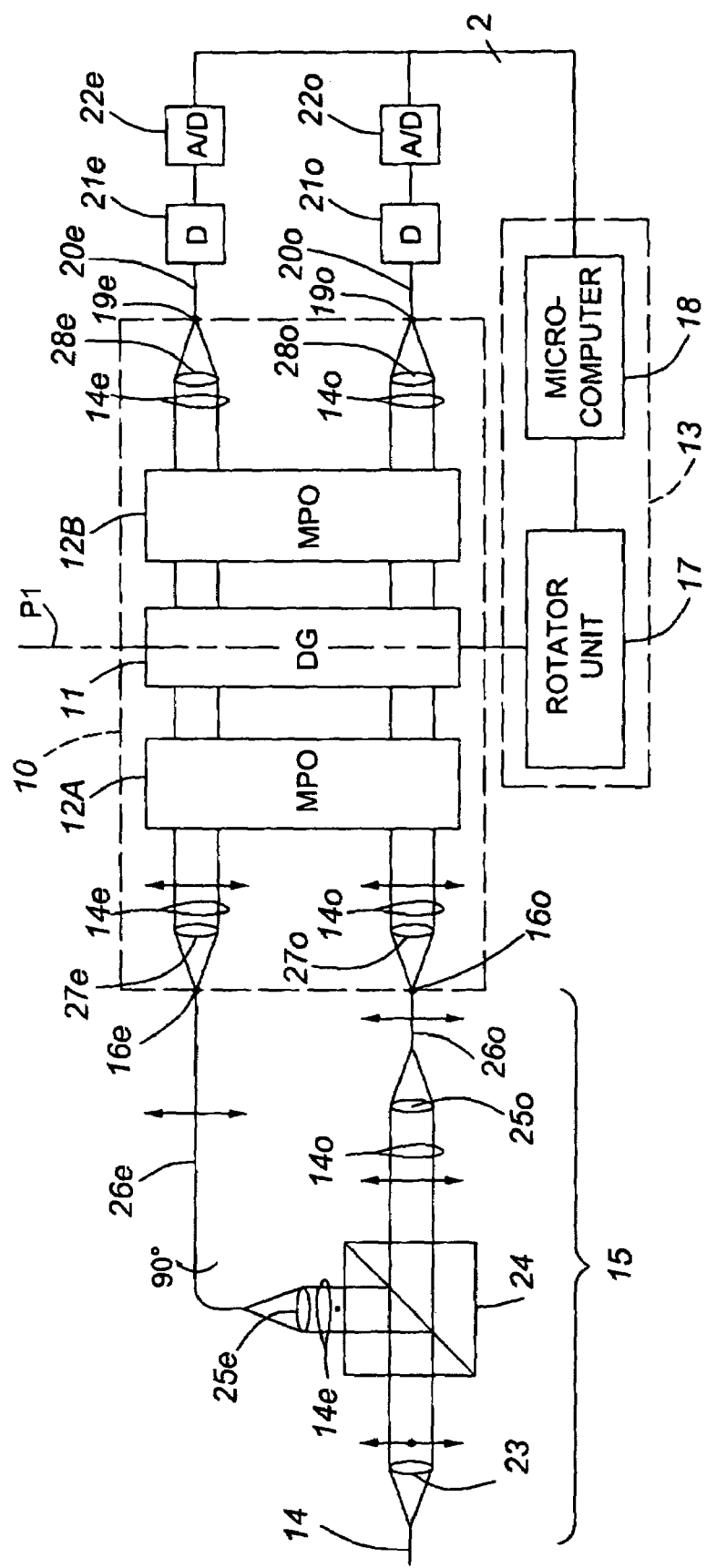
FIG. 1 is a schematic block diagram of an optical spectrum analyzer (OSA) having a pair of non-planar reflectors for reflecting light beams onto a diffraction grating.

In the drawings, identical or corresponding elements in the different Figures are identified with the same reference number. In addition, it is to be understood that the term "groove" embraces both the physical grooves in a ruled diffraction grating and their functional equivalent in, for example, a holographic grating. Moreover, for ease of depiction, FIGS. 1, 3–6, 8A and 11A show the multi-pass optics and diffraction grating as if they were coplanar, though they are not. For the same reason, FIG. 1 also does not depict the offset caused by each reflection and, in FIGS. 3–6, 8A and 11A, the path of only one of the two beams is shown, the other beam following an identical, but offset, path.

Figure 2:
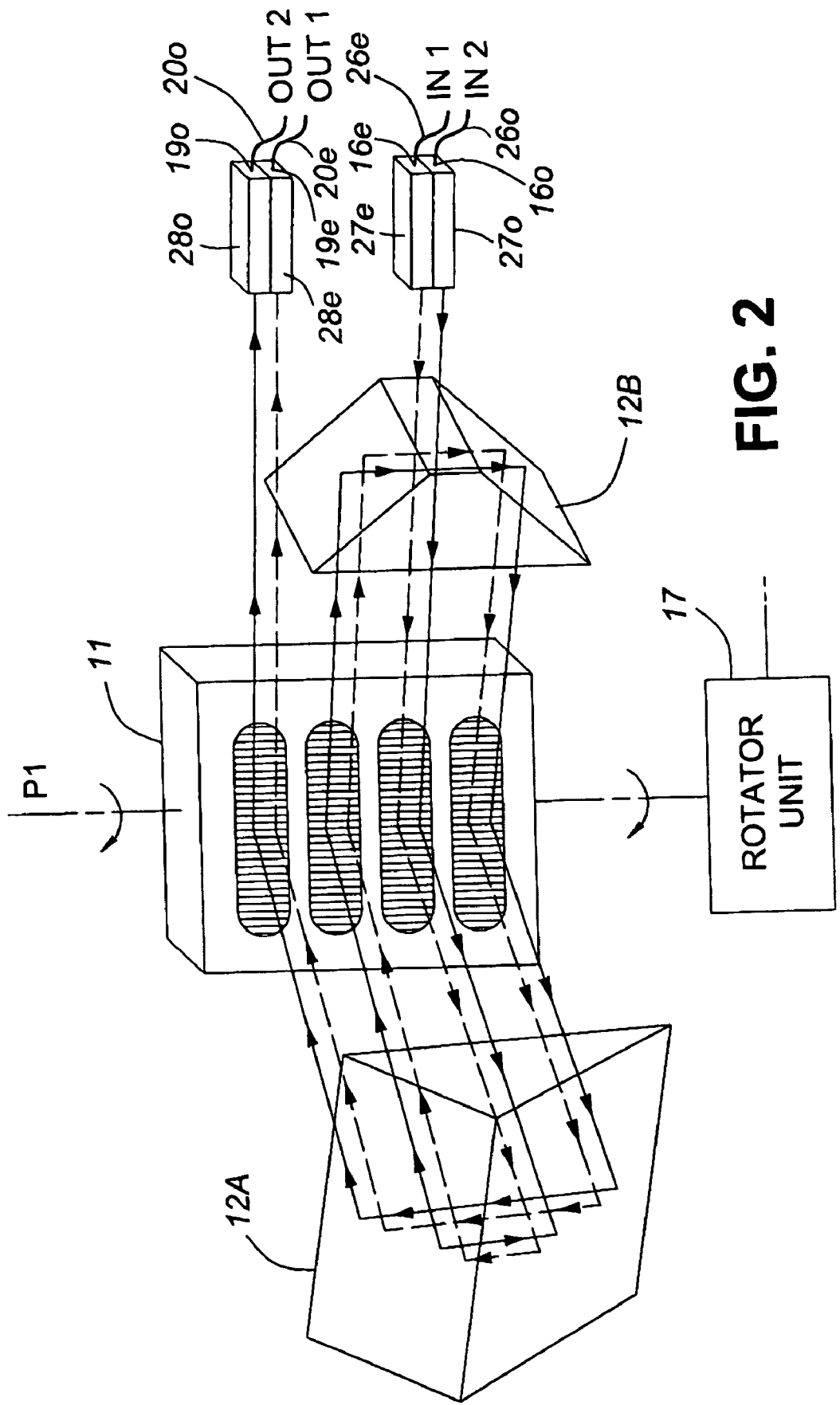
FIG. 2 is a schematic pictorial view of part of the OSA illustrating two beam paths whereby light beams pass across a reflective diffraction grating an even number of times.
Figure 6:
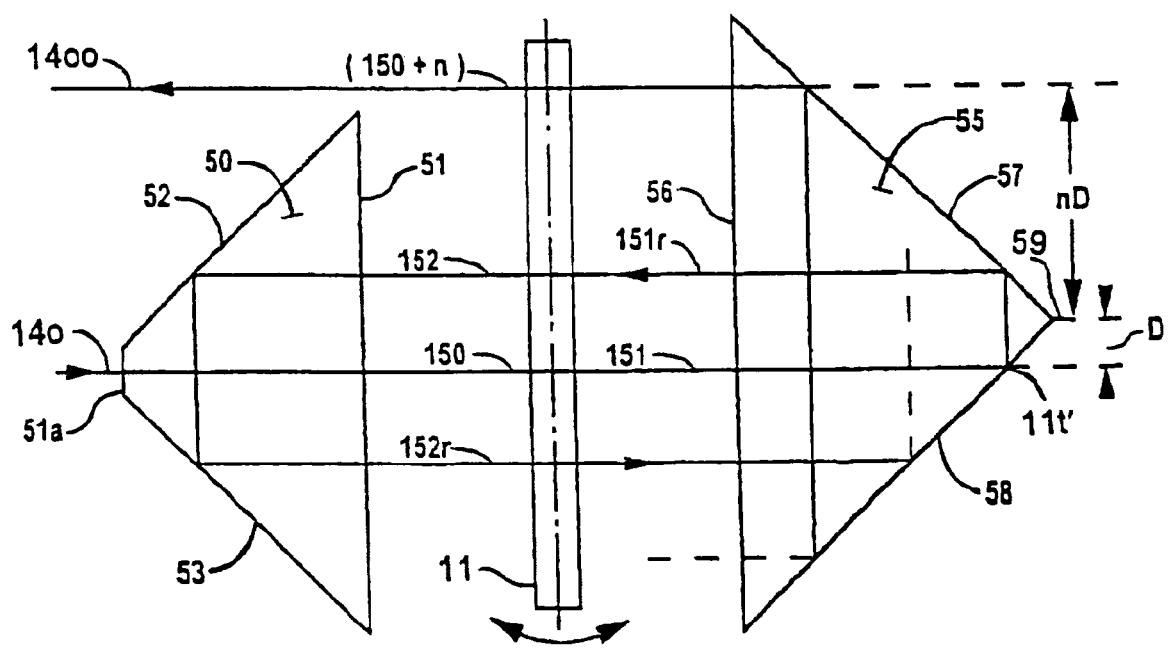
FIG. 6 is a schematic side view diagram which illustrates a generalized example of a beam path for the non-planar reflector configuration shown in FIG. 2.

Referring to FIGS. 1, 2 and 6 an optical spectrum analyzer comprises a polarization control module (PCM) 15 for converting orthogonal components of an input light beam 14 into two linearly-polarized light beams 14o and 14e corresponding to ordinary and extraordinary components of the input beam and directing the two light beams via input slits 16o and 16e, respectively, to a multi-pass dispersion unit 10 with their states of polarization parallel. The multi-pass dispersion unit 10 comprises a rotatable diffraction grating 11 and multi-pass optics parts 12A and 12B, and a control unit 13 comprising a rotator unit 17 for rotating the diffraction grating 11 about a rotation axis P1 under the control of a microcomputer 18. Both light beams pass through the multi-pass optics 12A/12B and onto the diffraction grating 11 such that they follow identical paths but offset one laterally relative to the other, i.e., they follow via mutually exclusive paths. The multi-pass dispersion unit 10 passes each light beam across the diffraction grating 11 several times, which improves the resolution (and hence the close-in ORR) of the optical spectrum analyzer.

Following multiple diffractions, the light beams leaving the multi-pass dispersion unit 10 are received by output slits 19o and 19e which are coupled by optical fibers 20o and 20e to photodetectors 21o and 21e, respectively, which detect their energy intensities $P_r$ and $P_t$. The corresponding electrical signals are converted to digital signals by A-to-D converters 22o and 22e, respectively. The digital signals are processed by the microcomputer 18 which applies wavelength-dependent calibration factors corresponding to each detector to correct for possible residual differential loss effects between the ordinary and extraordinary beams in the OSA, as well as detector sensitivity, etc. that may be different between the light beams and their respective detectors. The resulting signals are added to provide an indication of energy in a spectral band about the tuned wavelength. The microcomputer 18 receives from the rotator unit 17 signals corresponding to the instant rotation angle of the diffraction grating 11 and controls the rotator unit 17 to select different wavelengths, or to scan a spectral band of interest over a period of time.

The input light beam 14 may include wavelengths anywhere over a wide range in the near infrared (typically of 500 nm or more) including, for example, those wavelengths which are used for dense wavelength division multiplexed (DWDM) telecommunications. The precise range of operation depends upon the particular choice of grating parameters (grooves/mm, chosen spectral order, etc.), lens focal lengths, etc. By virtue of the dispersion, the light beams received by the output slits 19o and 19e will be at a different wavelength (actually a narrow spectral band) according to the angular position of the diffraction grating 11.

FIG. 1 illustrates one suitable example of PCM 15. Conventional polarization notation indicates states of polarization of light beams illustrated in FIG. 1. The PCM 15 is shown as receiving the input light beam 14, which may be of unknown state of polarization. A lens 23 collimates the input light beam 14 and directs the collimated light beam toward a polarization beam splitter 24, conveniently a birefringent element. The beam splitter 24 decomposes the collimated beam into its ordinary and extraordinary components to provide the two light beams 14o and 14e having mutually orthogonal linear states of polarization. The light beams 14o and 14e are focussed by GRIN lenses 25o and 25e, respectively, into polarization-maintaining optical fibers 26o and 26e. The opposite ends of the fibers 26o and 26e, which constitute the input slits 16o and 16e, direct the beams 14o and 14e towards the multi-pass diffraction grating (MPD) unit 10 and are oriented relative to the MPD unit 10 so that the two beams 14o and 14e will be incident upon the diffraction grating 11 with their states of polarization parallel to each other and to the dispersion planes of the diffraction grating 11. This entails relative rotation of the states of polarization through 90 degrees relative to each other.

Assuming that the ordinary component of the light beam 14o already has its SOP aligned parallel to a dispersion plane of the diffraction grating 11, the state of polarization of light beam 14e must be rotated through a quarter turn in the PCM 15. This is effected by twisting PMF 26e through 90 degrees relative to fiber 26o. In practice, of course, either or both of the fibers could be twisted to produce the required rotation, providing their SOPs are correctly oriented when the light beams they traverse the multi-pass dispersion unit 10.

FIG. 1 shows collimating lenses 27o and 27e which collimate the light from the input slits 16o and 16e and focussing lenses 28o and 28e for focussing the light beams leaving the dispersion unit 10 onto the ends of output slits 19o and 19e. The lenses 27o, 27e, 28o and 28e may be GRIN lenses. For ease of depiction, these lenses are shown as rectangular blocks in FIG. 2. For the same reason, although FIG. 2 shows the input slits directing the light beams directly onto the grating 11, this is not detailed in FIG. 1.

The diffraction grating 11 is disposed between the multi-pass dispersion unit parts 12A and 12B. These parts of the multi-pass dispersion unit 10 may take several forms, as will be described later. In FIG. 2, and corresponding side view FIG. 6, they comprise two right-angled prism reflectors, one having its apex truncated to form a facet 51a. The reflectors in FIGS. 1 and 2 have reference numbers 12A and 12B but, in FIG. 6 they have reference numbers 55 and 50 because FIG. 6 is generalized for "n" passes across the diffraction grating 11. The input slits 16o and 16e direct the linearly-polarized light beams through the facet 51a and onto the grating 11. The light beams will be reflected from the diffraction grating 11 a first time to the reflector 12A with the state of polarization parallel to a dispersion plane of the diffraction grating 11 and parallel to a preferred plane of incidence through the reflectors 12A and 12B. Reflector 12B returns the light back onto the diffraction grating 11 and the grating reflects it in the opposite direction (i.e. back towards reflector 12A). The reflectors 12A and 12B repeat this process several times until, following diffraction a last time by grating 11, the light beams bypass reflector 12B and leave the multi-pass dispersion unit 10 by way of the output slits 19o and 19e. Reflector 12B is slightly smaller than reflector 12A to facilitate such exit. Providing the state of polarization of the light beams is properly aligned with the dispersion plane and principal axis of the dispersion unit (reflectors), it will remain the same during multiple reflections by the diffraction grating.

The output slits 19o and 19e pass dispersed light within a narrow spectral band about a given wavelength. For spectrum analysis, the rotator unit 13 will be operated to cause the diffraction grating 11 and the slits 19o and 19e to sequentially and repeatedly select narrow spectral bands from across the entire potential spectrum of the light beam and scan a spectrum bandwidth of interest, perhaps to ascertain the functionality of a transmission system under test. The digitally converted and processed signals are stored in association with spectral tuning information in the micro-computer 18. If desired, however, the micro-computer 18 could be a separate desktop computer and a buffer used to store the information for later access.

In the discussion of the remaining Figures, particulars of rotation arrangements are not discussed as these are known to persons skilled in this art.

FIGS. 3, 4 and 5 to 7B illustrate various other configurations suitable for the MPD unit 10. In the MPD unit of FIG. 3, the path taken by only one of the collimated light beams, namely light beam 14o, is represented, for convenience of illustration, as a simple line. In addition to this, illustration of any additional collimating lens element as may be appropriate along entry and exit light paths is omitted. It should be appreciated from FIG. 1, which shows the collimated light beams 14o and 14e, in plan view, to be side by side, that the path taken by the collimated light beam 14e, though not shown in FIG. 3, follows an identical path displaced laterally behind the path taken by the beam 14o.

Figure 3:
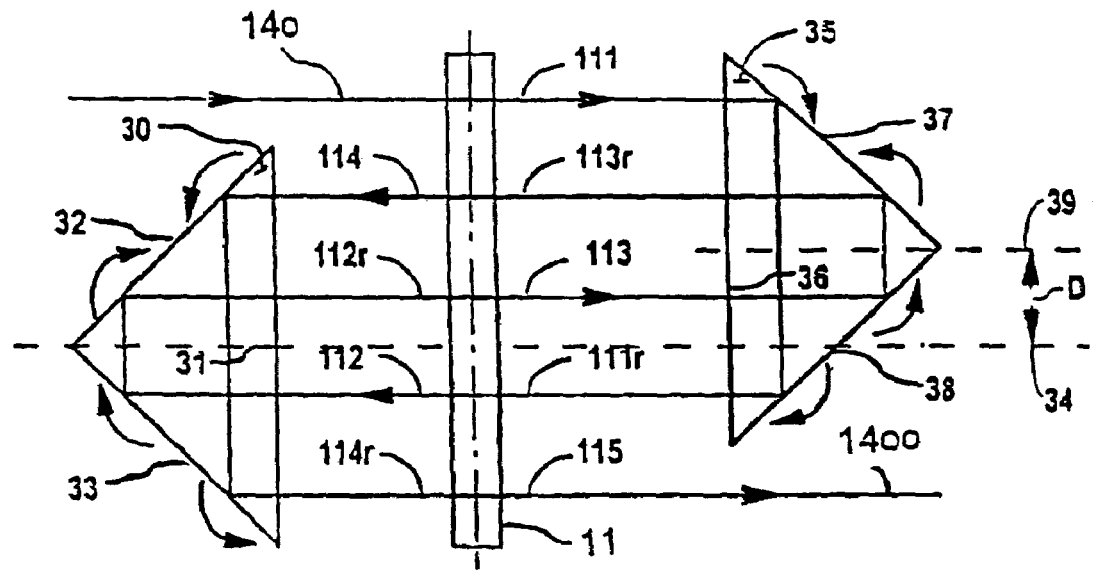
FIG. 3 is a schematic side view diagram showing a light beam passing across the diffraction grating an odd number of times.

The multi-pass optics parts 12A and 12B are represented in FIG. 3 as right angle solid reflectors 30 and 35. Some examples of preferred right angle reflectors are porro prisms, pi prisms and hollow roof mirrors. In this example, the reflectors 30 and 35 are porro prisms, illustrated in section to each have the form of a right angle isosceles triangle with bases 31 and 36 arranged spaced apart in substantially parallel relationship with respect to one another. The reflector 30 has reflective surfaces 32 and 33 which meet at a right angle apex as shown. The reflector 35 has reflective surfaces 37 and 38 which meet at a right angle apex as shown. The diffraction grating 11 is positioned between the bases 31 and 36 and extends beyond each. The reflectors 30 and 35 are shown with centre planes indicated by broken lines 34 and 39 respectively, which extend through their apexes and are parallel and vertically separated by a distance "D". Suitable mounting structures for maintaining the diffraction grating 11 and the reflectors 30 and 35 in the required position are well known to persons skilled in the art and are not discussed here.

The light beam 14o is shown to follow a path line 111, which is generally parallel to center plane 39, to traverse the diffraction grating 11 and thus complete a first pass therethrough. The path line 111 intersects with the reflective surface 37 at about 45° and thence crosses to the reflective surface 38 which it leaves along a reflected path line 111e. Each time the light beam is reflected, its propagation direction is, in effect, rotated through 90 degrees in the plane of incidence. For convenience, the direction of such rotation will subsequently be deemed to be clockwise or counter clockwise about the reflection point. The pair of reflections at the surfaces 37 and 38 cause the beam path to be redirected through 180° in a clockwise direction. The reflected path line 111e traverses the diffraction grating 11 in the opposite direction so that the beam completes a second pass therethrough to emerge along a path line 112. The path line 112 intersects the reflective surface 33 at about 45° and thence crosses to the reflective surface 32 which it leaves along a reflected path line 112r.

The pair of reflections at the surfaces 33 and 32 cause the beam to be redirected through 180°, again in a clockwise direction. The reflected path line 112r traverses the diffraction grating 11 so that the beam completes a third pass therethrough to emerge along a path line 113. The path line 113 intersects the reflective surface 38 and thence crosses to the reflective surface 37 which it leaves along a reflected path line 113r. The pair of reflections at the surfaces 38 and 37 cause the beam to be redirected through 180° yet again. This time, however, the reflection is in an opposite direction, i.e. counter-clockwise. The reflected path line 113r traverses the diffraction grating 11 so that the beam completes a fourth pass therethrough to emerge along a path line 114. The path line 114 intersects with the reflective surface 32 at about 45° and thence crosses to the reflective surface 33 which it leaves along a reflected path line 114r. The pair of reflections at the surfaces 32 and 33 cause the beam to be redirected through 180°, again in the counterclockwise direction. The reflected path line 114r traverses the diffraction grating 11 so that the beam completes a fifth pass therethrough to emerge along a path line 115. Referring back to FIG. 1, the output beam 14o' on path 115 corresponds to light beam 14o, which is detected by the detector 21o.

It should be noted that for each pair of reflections at one pair of the reflective surfaces 32,33 or 37,38 which rotate the beam propagation direction clockwise, there is a complementary pair of reflections at the same pair of reflective surfaces which rotate the beam propagation direction counterclockwise. Consequently, any errors in the beam orientation caused by inaccuracies in the angle between a particular pair of the reflective surfaces 32,33 or 37,38 will be corrected.

Figure 4:
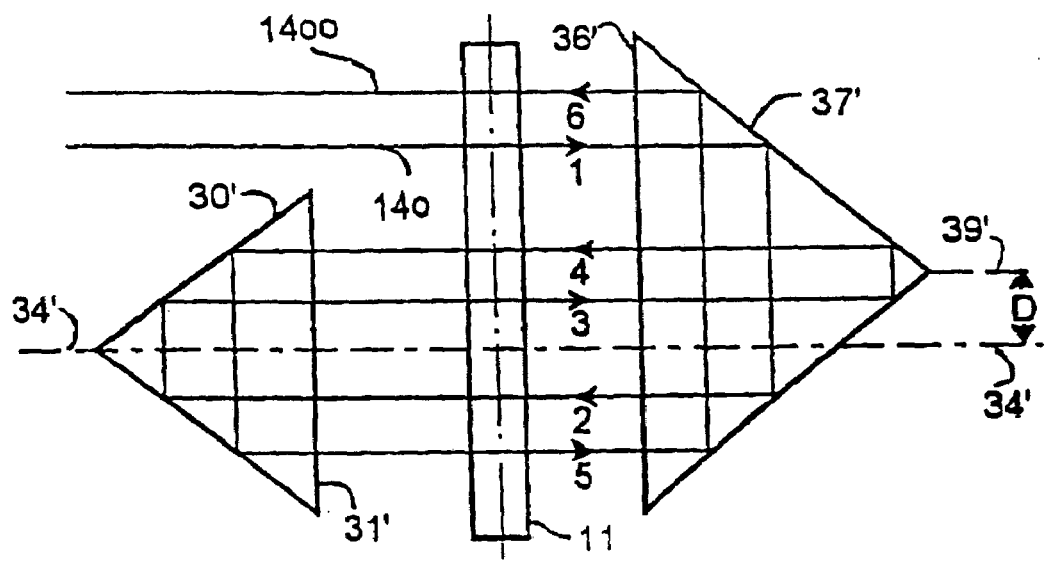
FIG. 4 is a schematic side view diagram which illustrates a light beam reflected an even number of times by each non-planar reflector such that, for each reflection causing rotation in one direction there is a reflection causing opposite rotation.

Whereas the multi-pass optical elements of FIG. 3 cause the light beam to traverse the diffraction grating 11 an odd number of times, the MPD unit illustrated in FIG. 4 causes the light beam to traverse the diffraction grating 11 an even number of times. The elements of the MPD shown in FIG. 4 are similar to those of the MPD shown in FIG. 3 and so have the same reference number, but with a prime. For the MPD of FIG. 4, base 31' of reflector 30' is significantly shorter than the base 36' of reflector 37' to allow room for the input beam 14o and the output beam 14oo to enter and leave, respectively, reflector 37'. The path taken by the light beam is clear from FIG. 4 and so will not be described.

Figure 5:
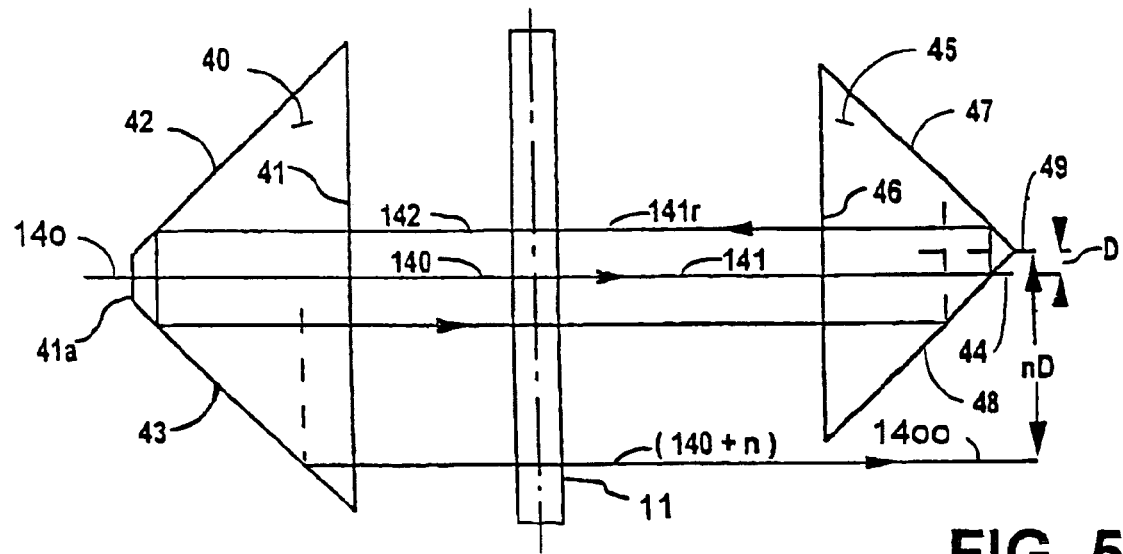
FIG. 5 is a schematic side view diagram which generally illustrates a beam path for an alternative non-planar reflector configuration.

In FIG. 5 each of optical elements 40 and 45, be they prisms or mirrors, is capable of reflecting through 180° a light beam incident normal to its base, In this example, an apex of reflective surfaces 42 and 43 of element 40 is truncated by a flat surface 41a, parallel to its base 41. The surface 41a provides a portal for accepting a light beam along a beam path 14o into the optical element 40. The beam path in this configuration of the reflectors 41 and 42 is shown to traverse the diffraction grating 11 "n" times, where "n" is an odd number. The optical element 45 includes reflective surfaces 47 and 48 projecting from a base 46 and intersecting each other at a right angle. The diffraction grating 11 is positioned between the bases 41 and 46 and extends beyond each. The elements 40 and 45 are shown with centre planes, indicated by broken lines 44 and 49 respectively, which are spaced apart parallel to each other and separated by a distance "D". The beam path is illustrated as discontinuous since, in this generic example, the odd number of passes across the diffraction grating 11 would be dictated by the actual dimensions of any particular example of this generic form.

A path of the light beam 14o is shown to enter the surface 41a along path line 140, traverse the diffraction grating 11, thus completing a first pass therethrough, and thence follow a path line 141. The path line 141 intersects with the reflective surface 48 at a position adjacent the apex and thence crosses to the reflective surface 47, which it leaves along a reflected path line 141r. The reflected path line 141r traverses the diffraction grating 11 so that the beam completes a second pass therethrough in the opposite direction to emerge along a path line 142. Following reflection at surfaces 42 and 43, the light beam traverses the diffraction grating 11 again.

Following multiple reflections at the two reflectors, the beam emerges along the beam path labelled (140+n). Thus, an input light beam 14o which has traversed the diffraction grating 11 all "n" times, becomes the beam 14oo, shown to exit left to right, and is intercepted by the detector 16 (shown in FIG. 1). Though the pair of reflectors in FIG. 5 are shown to be generally alike, it is not essential for them to be the same. For example, it is envisaged that a pair of such elements might be a Porro prism and a hollow roofed mirror. In this case, the length of the diffraction grating 11 is at least equal to the length of the base 41, which itself has a length in excess of twice a product "nD", where "n" is an odd number and is the number of traverses of the diffraction grating 11 by the light path.

FIG. 6, which shows a generalization of FIG. 2, illustrates a MPD unit similar to that shown in FIG. 5 but which causes the light beam to traverse the diffraction grating 11 an even number of times. In the unit shown in FIG. 6, optical elements 50 and 55 comprise a pair of right-angle reflectors each capable of reflecting a beam of light through 180°. In the reflector 50, reflective surfaces 52 and 53 project from the base 51 perpendicular one with respect to the other. The truncated element 50 has a surface 51a parallel to its base 51 for accepting the beam 11o into the optical element 50 near what would otherwise be the apex of the right angled triangle formed by the reflective surfaces 52 and 53 and base 51. Reflector element 55 includes reflective surfaces 57 and 58 projecting from a base 56 and meeting at an apex defining a right angle. The bases 51 and 56 are spaced apart in a parallel relationship and the diffraction grating 11 is positioned between them.

The reflectors 50 and 55 are shown with centre planes indicated by broken lines 54 and 59, respectively, which are parallel and spaced apart by a distance "D". The beam 14o enters through the surface 51a following a beam path 150, traverses the diffraction grating 11 to complete a first pass therethrough, and thence follows a path line 151. The path line 151 intersects with the reflective surface 58 and thence crosses to the reflective surface 57 which it leaves, as a reflected path line 151r. The reflected path line 151r traverses the diffraction grating 11 so that the beam completes a second pass therethrough in the opposite direction to emerge along a path line 152. The light beam is reflected back and forth and, following a final reflection from the reflective surface 57, traverses the diffraction grating 11 for the nth time to emerge following the beam path labelled (150+n). Thus, after an even number of traverses, as generically illustrated, and having traversed the diffraction grating all "n" times, the input light beam 14o becomes the beam 14oo, shown to exit right to left, and is intercepted by the detector 16 (shown in FIG. 1). The exiting beam path (150+n) is displaced a vertical distance "nD" from the entry beam path 150 through the surface 51a, or stated differently, a distance "(n−1)D" from the centre line or apex plane 59 of the optical element 55. In this particular arrangement, the optical element 55 may be larger than the optical element 50, assuring that the beam is directed to be reflected from the diffraction grating 11 from right to left along the path (150+n) after an even number of passes. In this case the diffraction grating 11 is of greater length than the base 51, that is to be of a length in excess of "2 nD".

Figure 7A:
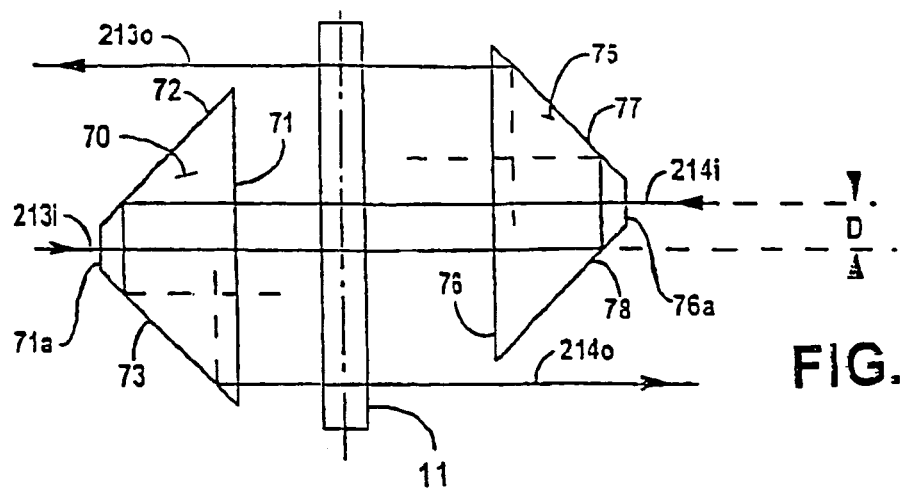
FIGS. 7A and 7B are schematic side and plan view diagrams which illustrate a further example of a beam path for an alternative non-planar reflector configuration.
Figure 7B:
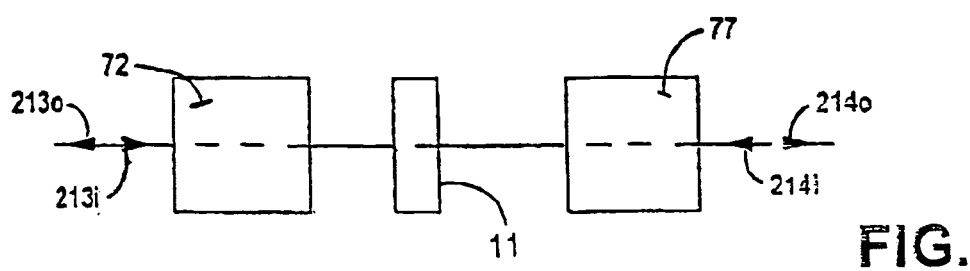

FIGS. 7A and 7B illustrate another variation of the MPD unit which includes optical reflectors provided by prisms 70 and 75 arranged about diffraction grating 11. The prism 70 includes reflective surfaces 72 and 73 extending from a base 71 and converging at a right angle truncated by a flat surface 71a, parallel with the base 71. The prism 75 is similar, including reflective surfaces 77 and 78 extending from a base 76 and converging at a right angle truncated by a flat surface 76a, parallel with the base 76. In contrast to the embodiment of FIGS. 3 to 6, two light beams enter the prisms 70 and 75 by way of input paths 213i and 214i, respectively, and exit prisms 75 and 70 by way of output paths 213o and 214o, respectively. In contrast to the previously described examples, these paths are vertically separated but are not necessarily laterally separated. The input path 213i is incident, left to right, into the surface 71a, and traverses the prism 70 and the diffraction grating 11 on a straight line before being directed through 180° by the reflective surfaces 78 and 77. Following multiple reflections by the two prisms 70 and 75, the path emerges from the base 76, a final time, to traverse the diffraction grating 11, from right to left, where it is labelled as the output path 213o. The input path 214i is incident, right to left, upon the surface 76a and traverses the prism 70 and the diffraction grating 11 on a straight line before being directed through 180° by the reflective surfaces 72 and 73. Following multiple reflections by the two prisms 70 and 75, the path emerges from the base 71, a final time, to traverse the diffraction grating 11, from left to right, where it is labelled as the output path 214o. Any light beams having traversed the diffraction grating 11 via either of these beam paths emerge confined to a narrow spectral width as selected by the diffraction grating 11 and are detected by the detectors 21e and 21o.

Figure 8A:
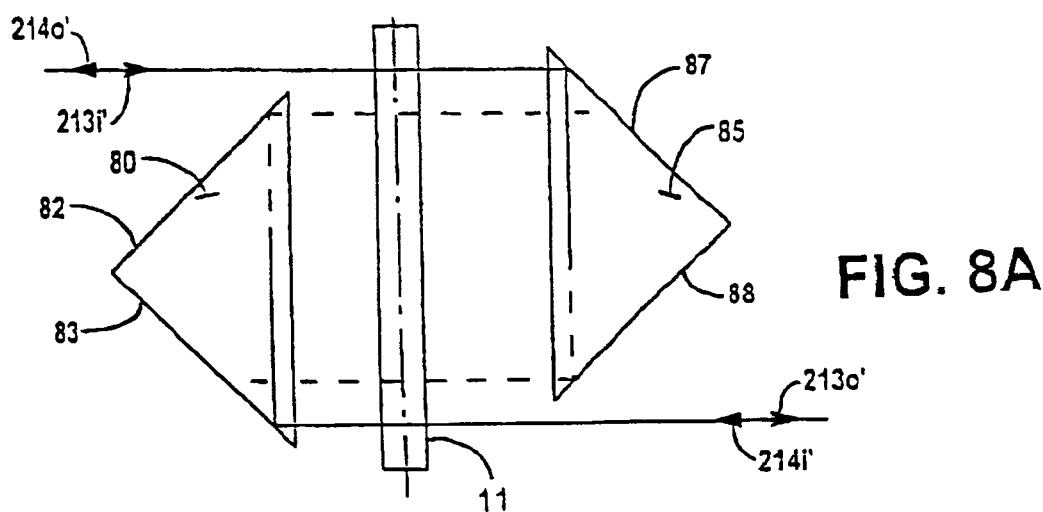
FIGS. 8A and 8B are schematic side and plan view diagrams which illustrate a beam path for yet another non-planar reflector configuration.
Figure 8B:
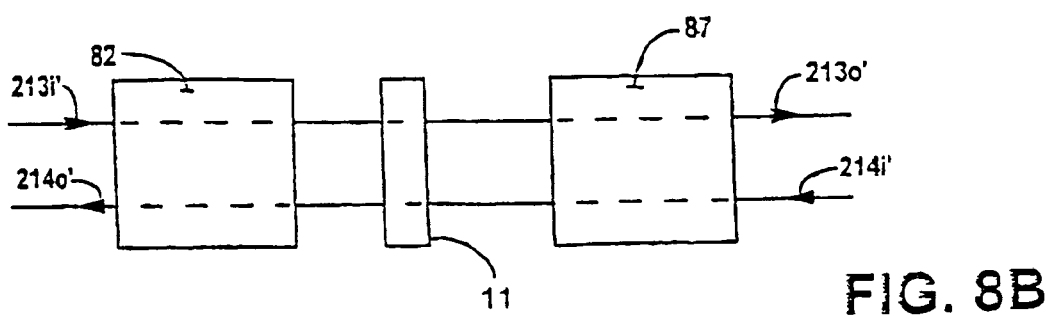

FIGS. 8A and 8B illustrate a variation of the MPD unit which includes optical reflectors provided by prisms 80 and 85 arranged about diffraction grating 11 and is suitable for use in the modified OSA described with reference to FIG. 3. The prism 80 includes reflective surfaces 82 and 83 extending from a base and converging at a right angle to intersect along an apex parallel with its base. Likewise, the prism 85 is similar, including reflective surfaces 87 and 88 extending from a base and converging at a right angle to intersect along an apex parallel with its base. Input light beams 14o and 14e are illustrated as following input paths 213i' and 214i', respectively, and paths for both output light beams 11oo and 11eo are illustrated as output paths 213o' and 214o', respectively. In contrast to the example in FIGS. 7A and 7B, these paths are laterally separated but are not necessarily vertically separated. Any light energy having traversed the diffraction grating 11 via either of these beam paths emerges confined to a narrow spectral width as selected by the diffraction grating 11 and are ready for detection.

It should be appreciated that the MPD units illustrated in FIGS. 3 to 6 could be used in a similar manner with two light beams following parallel, laterally-offset paths.

In any of the above-described embodiments, the reflectors could comprise hollow roof mirrors, porro prisms, or pi prisms. FIGS. 9A and 9B illustrate a hollow roof mirror having a body 91 comprising limbs extending normal to one another from an apex to provide reflective surfaces 92 and 93.

FIGS. 9C and 9D illustrate a hollow roof mirror having a body 94 comprising limbs extending normal to one another from an apex to provide reflective surfaces 95 and 96. In contrast to the hollow roof mirror in FIGS. 9A and 9B, the limbs are interrupted at the apex to define a central opening 96 to facilitate passage of a light beam therethrough, enabling the hollow roof mirrors to be used in the MPD units shown in FIGS. 5 to 7B.

The porro prism shown in FIG. 10A comprises a body 120 defined by a base 121 and reflective surfaces 122 and 123 extending convergently from the base 121 and joined normal to one another along a vertical apex 121a. The porro prism shown in FIG. 10B is similar to the porro prism in FIG. 10A, but it is viewed with its apex 126a in a horizontal position. The porro prism in FIG. 10B comprises a body 125 defined by a base 126 and reflective surfaces 127 and 128 extending in a convergent fashion from the base 126 and joined normal to one another along the apex 126a.

FIGS. 10A and 10B are presented in the particular orientation shown, as an aid to understanding the structure of the pi prism illustrated in the adjacent FIG. 10C. The pi prism is thus illustrated with structural elements labelled with numbers corresponding to those in the FIGS. 10A and 10B, but distinguished with prime notations. The pi prism may be viewed as a combination of two porro prisms orientated as shown in FIGS. 10A and 10B, but altered such that the surfaces 122 and 123 are non reflective and a base 121 is reflective, and with surface 123 is abutted to the base 126 whereby the said surface and base are rendered nonentities. Thus, bodies 120 and 125 correspond to areas of the pi prism labelled 120' and 125' respectively.

A light beam labelled 120i is shown to be incident normal to the surface 122' and meets the surface 121' where it is reflected through a first 90° angle; is directed toward a reflective surface 125' where it is reflected through a second 90° angle, but about an axis normal to an axis of the first 90° angle; is directed (downwards in the Figure) to the reflective surface 128' where it is reflected through a third 90° angle about an axis parallel to an axis of the second 90° angle; is directed toward the reflective surface 121' again where it is reflected through a fourth 90° angle, about an axis parallel to the axis of the first 90° angle; and finally is directed to exit the pi prism as a light beam labelled 120r normal to the surface 122'.

The MPD unit shown in FIGS. 11A to 11D uses a pair of pi prisms 130 and 135 generally similar to the pi prism shown in FIG. 10C and arranged spaced one each side of a diffraction grating 11. FIG. 11A is a plan view of the multi-pass tunable optical filter unit and FIG. 11C is a side elevation, while FIGS. 11B and 11D are opposite end elevations. The pi prism 130 includes a reflective surface 133 extending from an edge 134a to converge normal toward a reflective surface 132 and join therewith via a transparent flat surface 131a, as shown in FIG. 11B. Each of the surfaces 131a, 132 and 133 is joined normal with a transparent flat surface 134 which extends to join with a reflective surface 131 along an edge 134b, defining an interior angle of 45° therewith.

The pi prism 135 is similar, and includes a reflective surface 138 extending from an edge 139a to join along an apex at 90° with a reflective surface 137, as shown in FIG. 11D. The surfaces 137 and 138 are joined normal with a transparent flat surface 139 which extends to join with a reflective surface 136 along an edge 139b, defining an interior angle of 45° therewith.

FIGS. 11A–11D show only a single multi-reflected light path for convenience of illustration. Operation of the pi prism MPD unit is illustrated with the light path entering the pi prism 130 as a light beam 130i incident normal to the transparent flat surface 131a. The light path is then reflected from the surface 131 and exits the pi prism 130 via the surface 134. After traversing the diffraction grating 11 a first time, the light path enters the pi prism 135 normal to surface 139 as shown at a point of incidence "1" in FIG. 11D. After reflections from surfaces 136, 138, 137 and 136 again, in that order, it exits the pi prism 135 as shown in FIG. 11D at a point of departure "2".

After traversing the diffraction grating 11 a second time, the light path enters the pi prism 130 as shown in FIG. 11B as a point of incidence "2". After reflections from surfaces 131, 133, 132 and 131 again, in that order, it exits the pi prism 131 as shown at a point of departure "3" (FIG. 11B). The light path traverses the diffraction grating 11 a third time and so on, as generally illustrated in FIGS. 11A–11D, until the light path exits via the surface 134 (see FIG. 11A) at a point of egress 130r, also shown as a point of departure "n", to traverse the diffraction grating for an nth time.

Any energies of a light beam having traversed the diffraction grating 11 for the nth time are directed to and detected by one of the detectors 21e and 21o. It should be realized that the MPD unit as illustrated will provide for at least another light path by providing another light beam point of incidence laterally spaced from the light beam point of incidence 130i in FIG. 11A and by providing direction from a point of egress spaced vertically from the point of egress 130r in FIG. 11B, to another of the detectors 21e and 21o.

It should be appreciated that, of the various multi-pass optics arrangements described hereinbefore, only those shown in FIGS. 3 and 4 provide correction for deviation of the reflector angle from a true right angle, i.e. by ensuring that, for most or all reflections at a surface in a clockwise direction, there are an equal number of reflections in the counterclockwise direction.

While the above described OSA comprises a reflective diffraction grating, it will be appreciated that a transmissive diffraction grating may be used instead, with appropriate adjustment of the geometry of the multi-pass dispersion unit 10.

There are, of course, other ways the two linearly-polarized beams could be produced so long as they are orthogonal components of the input light beam. For example, a birefringent device could be used.

In the above-described embodiments, the input and output slits 16o, 16e, 19o, 19e are respective ends of optical fibers and hence circular in shape. It will be appreciated, however, that the slits need not be circular but could be any other suitable shape.

It will be appreciated that the control means 13 could select the wavelengths by rotating the multi-pass optics components rather than the diffraction grating 11. In a specific example of such a modification, where multi-pass optics part 12A was rotated and the diffraction grating 11 remained fixed, the diffraction grating 11 comprised 1100 grooves/mm, the focal lengths of the lenses 27o, 27e, 28o, 28e were each 15 mm, and the angle of incidence on the grating was approximately 75 degrees.

INDUSTRIAL APPLICABILITY

A robust, simple optical spectrum analyzer apparatus embodying the invention may provide improved performance and economy, particularly in a portable configuration. An inherently polarization-dependent characteristic of a diffraction grating is rendered substantially inconsequential by decomposing an incident light beam into two light beams corresponding to its constituent orthogonal linear states of polarization, their states of polarization then being rendered parallel to each other and parallel to a dispersion plane of the diffraction grating.

The rotation of a linear SOP by means of PMF is essentially independent of wavelength for wavelengths longer than the cut-off wavelength (typically 1250 nm for telecommunications applications) for single-mode fiber. Hence, the use of PMF avoids losses associated with other rotators, such as waveplates. Improved resolution and optical rejection ratio are realized by using a diffraction grating with input and output slits in conjunction with a pair of reflector elements to achieve multiple passes of the two paths traversing the diffraction grating. Compact design is achieved by using lenses with short focal lengths. The use of such short focal length lenses also mitigates the effects of chromatic dispersion, which is particularly detrimental when measurements are made over a large spectral range.

An advantage of outputting the two light beams separately is that any difference in losses experienced by each of the two light beams and differences in the wavelength-dependent detector efficiencies of the corresponding detectors can be corrected independently after conversion to corresponding electrical signals, conveniently using a micro-computer.

Many modifications to the above described embodiments of the invention can be carried out without departing from the spirit thereof, and therefore the scope of the present invention is limited only by the appended claims.

What is claimed is:

1. An optical spectrum analyzer apparatus comprising:
   a reflective diffraction grating element for angularly dispersing light incident thereupon according to its constituent wavelengths;
   a polarization control module for receiving input light for analysis, decomposing the received input light into its ordinary and extraordinary components to produce corresponding first and second light beams having respective mutually orthogonal linear states of polarization and, using at least one twisted polarization-maintaining fiber, rotating the state of polarization of at least one of the first and second light beams relative to the state of polarization of the other of the first and second light beams until the two states of polarization are parallel,
   input slit means for receiving said first and second light beams from the polarization control module and directing said first and second light beams to said diffraction grating element such that their states of polarization are parallel to each other and perpendicular to the dispersion plane of the diffraction grating element;
   a pair of non-planar optical reflection means for defining paths whereby each of said first and second light beams is directed to traverse the diffraction grating element a predetermined plurality of times each traversal occurring in a different dispersion plane from the previous traversal;
   output slit means for selectively receiving at least a portion of each of the first and second light beams following diffraction said predetermined plurality of times;
   detection means for detecting the first and second light beams leaving the output slit means and detecting energy at each of said different wavelengths without first recombining the light beams optically; and
   control means for adjusting one or both of the diffraction grating element and the non-planar optical means so as to select different wavelengths of the dispersed first and second light beams for output by the output slits and processing the detected energy values.

2. An optical spectrum analyzer according to claim 1, wherein the detection means comprises first and second detectors for detecting energies of the first and second light beams, respectively, after diffraction by the diffraction grating element, and providing corresponding first and second electrical signals, respectively.

3. An optical spectrum analyzer according to claim 2, wherein the control means comprises computer means for controlling the rotation of the diffraction grating by way of a rotator device and processing said first and second electrical signals to obtain energies levels with respect to wavelength.

4. An optical spectrum analyzer according to claim 1, wherein the non-planar optical reflection means comprises a pair of right angle reflectors disposed so as to reflect each of said first and second light beams back and forth between them said predetermined plurality of times while maintaining its polarization state.

5. An optical spectrum analyzer according to claim 4, wherein the pair of right angle reflectors each have a pair of reflective surfaces extending at a right angle to each other, the reflectors being disposed so that a light beam incident upon one of the reflectors obliquely to one of its reflective surfaces will be reflected back and forth between the right angle reflectors to be diffracted by the diffraction grating element said predetermined plurality of times, the reflectors being positioned such that their respective apexes are offset by a predetermined displacement in a direction perpendicular to the dispersion plane so that, following the plurality of diffractions, the light beams enter or leave the non-planar optical means from an outer edge portion of one of the reflectors.

6. An optical spectrum analyzer according to claim 5, wherein at least one of the pair of right angle reflectors includes a planar surface extending substantially perpendicular to the paths taken by the light beams when travelling between the pair of right angle reflectors and truncating the pair of reflective surfaces short of an apex between notional extensions of the surfaces, the planar surface for either receiving or emitting at least one of the light beams.

7. An optical spectrum analyzer according to claim 5, wherein the pair of reflectors is selected from porro prisms, pi prisms and hollow roof mirrors.

8. An optical spectrum analyzer according to claim 4, wherein the pair of right angle reflectors is selected from porro prisms, pi prisms and hollow roof mirrors.

9. An optical spectrum analyzer according to claim 6, wherein the pair of right angle reflectors is selected from porro prisms, pi prisms and hollow roof prisms.

10. An optical spectrum analyzer according to claim 1, wherein the control means is arranged to rotate the diffraction grating element about an axis (P1) perpendicular to its dispersion plane so as to scan a predetermined spectrum of the light beam, and further comprises computer means connected with the detector means and the adjusting means for storing indications of detected energies in association with calibrated indications of spectral tuning of the diffraction grating element.

11. An optical spectrum analyzer according to claim 4, wherein the control means comprises a rotator device arranged to displace at least one of the right angle reflectors angularly about an axis (P1) perpendicular to the dispersion plane so as to scan a predetermined spectrum of the light beam, and computer means connected to the detector means and the rotator device for storing indications of detected energies in association with calibrated indications of spectral tuning of the diffraction grating element.

12. An optical spectrum analyzer apparatus comprising:
a transmissive diffraction grating element for angularly dispersing light incident thereupon according to its constituent wavelengths;
a polarization control module for receiving input light for analysis, decomposing the received input light into its ordinary and extraordinary components to produce corresponding first and second light beams having respective mutually orthogonal linear states of polarization and, using at least one twisted polarization-maintaining fiber, rotating the state of polarization of at least one of the first and second light beams relative to the state of polarization of the other of the first and second light beams until the two states of polarization are parallel,
input slit means for receiving said first and second light beams from the polarization control module and directing said first and second light beams to said diffraction grating element such that their states of polarization are parallel to each other and perpendicular to the dispersion plane of the diffraction grating element;
a pair of non-planar optical reflection means for defining paths whereby each of said first and second light beams is directed to traverse the diffraction grating element a predetermined plurality of times each traversal occurring in a different dispersion plane from the previous traversal;
output slit means for selectively receiving at least a portion of each of the first and second light beams following diffraction said predetermined plurality of times;
detection means for detecting the first and second light beams leaving the output slit means and detecting energy at each of said different wavelengths without first recombining the light beams optically; and
control means for adjusting one or both of the diffraction grating element and the non-planar optical means so as to select different wavelengths of the dispersed first and second light beams for output by the output slits and processing the detected energy values.

13. An optical spectrum analyzer according to claim 12, wherein the detection means comprises first and second detectors for detecting energies of the first and second light beams, respectively, after diffraction by the diffraction grating element, and providing corresponding first and second electrical signals, respectively.

14. An optical spectrum analyzer according to claim 13, wherein the control means comprises computer means for controlling the rotation of the diffraction grating by way of a rotator device and processing said first and second electrical signals to obtain energies levels with respect to wavelength.

15. An optical spectrum analyzer according to claim 12, wherein the non-planar optical reflection means comprises a pair of right angle reflectors disposed so as to reflect each of said first and second light beams back and forth between them said predetermined plurality of times while maintaining its polarization state.

16. An optical spectrum analyzer according to claim 15, wherein the pair of right angle reflectors each have a pair of reflective surfaces extending at a right angle to each other, the reflectors being disposed so that a light beam incident upon one of the reflectors obliquely to one of its reflective surfaces will be reflected back and forth between the right angle reflectors to be diffracted by the diffraction grating element said predetermined plurality of times, the reflectors being positioned such that their respective apexes are offset by a predetermined displacement in a direction perpendicular to the dispersion plane so that, following the plurality of diffractions, the light beams enter or leave the non-planar optical means from an outer edge portion of one of the reflectors.

17. An optical spectrum analyzer according to claim 16, wherein at least one of the pair of right angle reflectors includes a planar surface extending substantially perpendicular to the paths taken by the light beams when travelling between the pair of right angle reflectors and truncating the pair of reflective surfaces short of an apex between notional extensions of the surfaces, the planar surface for either receiving or emitting at least one of the light beams.

18. An optical spectrum analyzer according to claim 16, wherein the pair of reflectors is selected from porro prisms, pi prisms and hollow roof mirrors.

19. An optical spectrum analyzer according to claim 15, wherein the pair of right angle reflectors is selected from porro prisms, pi prisms and hollow roof mirrors.

20. An optical spectrum analyzer according to claim 17, wherein the pair of right angle reflectors is selected from porro prisms, pi prisms and hollow roof prisms.

21. An optical spectrum analyzer according to claim 12, wherein the control means is arranged to rotate the diffraction grating element about an axis (P1) perpendicular to its dispersion plane so as to scan a predetermined spectrum of the light beam, and further comprises computer means connected with the detector means and the adjusting means for storing indications of detected energies in association with calibrated indications of spectral tuning of the diffraction grating element.

22. An optical spectrum analyzer according to claim 15, wherein the control means comprises a rotator device arranged to displace at least one of the right angle reflectors angularly about an axis (P1) perpendicular to the dispersion plane so as to scan a predetermined spectrum of the light beam, and computer means connected to the detector means and the rotator device for storing indications of detected energies in association with calibrated indications of spectral tuning of the diffraction grating element.

* * * * *